United States Patent [19]
Mantell

[11] Patent Number: 5,784,496
[45] Date of Patent: Jul. 21, 1998

[54] ERROR SUM METHOD AND APPARATUS FOR INTERCOLOR SEPARATION CONTROL IN A PRINTING SYSTEM

[75] Inventor: David A. Mantell, Rochester, N.Y.

[73] Assignee: Xerox Corporation, Stamford, Conn.

[21] Appl. No.: 720,234

[22] Filed: Sep. 26, 1996

[51] Int. Cl.$^6$ .............................. G06T 5/00; H04N 1/405; H04N 1/52
[52] U.S. Cl. .................... 382/237; 382/252; 382/270; 358/534; 358/456; 358/466
[58] Field of Search .......................... 382/237, 252, 382/270; 358/534, 535, 536, 456, 457, 458, 460, 466, 465, 298; 395/109

[56] References Cited

U.S. PATENT DOCUMENTS

| | | | |
|---|---|---|---|
| 5,045,952 | 9/1991 | Eschbach | 358/447 |
| 5,353,127 | 10/1994 | Shiau et al. | 358/458 |
| 5,375,002 | 12/1994 | Kim et al. | 358/521 |
| 5,434,672 | 7/1995 | McGuire | 358/296 |
| 5,535,019 | 7/1996 | Eschbach | 358/456 |
| 5,565,994 | 10/1996 | Eschbach | 358/534 |

FOREIGN PATENT DOCUMENTS

654940A1  5/1995  European Pat. Off. .

OTHER PUBLICATIONS

Knox, Keith T. and Echbach Reiner, "Threshold Modulation in Error Diffusion", Journal of Electronic Imaging, Jul. 1993, pp. 185–192.

*Primary Examiner*—Scott Rogers
*Attorney, Agent, or Firm*—Daniel J. Krieger

[57] ABSTRACT

A method for processing an input image including a plurality of input pixels each having a first number of possible input levels of optical density to form an output image including a plurality of separations each including a plurality of output pixels each having a second number of possible output levels of optical density. The method includes the steps of generating a first threshold reference signal as a function of a plurality of error signals, each of the plurality of error signals being derived by processing previous ones of pixels in each of the plurality of separations, modifying a current one of the plurality of input pixels in a current one of the plurality of separations in accordance with an error signal derived by processing previous ones of pixels in the current one of the plurality of separations, generating a second threshold reference signal for the current one of the plurality of input pixels, and forming one of the output pixels by comparing the modified current one of the plurality of input pixels to the generated first threshold reference signal and the generated second threshold reference signal.

20 Claims, 3 Drawing Sheets

ERROR SUM METHOD AND APPARATUS FOR INTERCOLOR SEPARATION CONTROL IN A PRINTING SYSTEM

FIELD OF THE INVENTION

This invention relates generally to quantization or halftoning in a color document processing apparatus and more particularly to an error sum method and apparatus for inter-separation color image processing using error diffusion in a liquid ink printer.

BACKGROUND OF THE INVENTION

The representation of continuous tone pictorial data in a binary or multilevel format is a major concern as the need increases to transmit and display images. The binary representation or multilevel representation of continuous tone image information is desired in order to reduce the sensitivity to noise in transmission and storage of the image information or to enable the accurate depiction of continuous tone originals with binary or multilevel media.

In the general field of digital halftoning, different methods exist to convert continuous tone images to binary images in such a manner as to preserve the appearance of tonal gradations similar to the original image. In the digital reproduction of documents, a color separation which provides varying densities of a single primary color is combined with other separations to produce a full color image. The color separation is conveniently represented as a monochromatic bitmap, which may be described as an electronic image with discrete signals (hereinafter, "pixels") defined by a position and a density. In such a system, density is described as one level in a number of possible states or levels. When more than two levels of density are used in the description of the image, the levels are often termed "gray" indicating that they vary between a maximum and a minimum, and without reference to their actual color. Most printing systems have the ability to reproduce an image with a small number of levels, most commonly two, although other numbers of levels are possible. For instance, ink jet printers typically operate with two levels while acoustic ink jet printers can operate with more than two levels.

Printing systems or display systems receive information from known input devices including document scanners, digital cameras, and computer imagery generators. These common input devices are, however, capable of describing an image with a substantially larger number of gray levels, for instance, 256 levels being a commonly selected number, although larger and smaller levels are possible. Consequently, it is necessary that an image initially described with a large set of levels be describable with a smaller set of levels in a manner which captures the information of the original image and which is satisfactory to the ultimate user. Usually in digital reproduction of color documents, this means that each of the color separations is reduced from the input number of levels to a smaller output number of levels. The multiple color separations are combined together at printing to yield the final color print. Commonly, color documents are formed using cyan, magenta, and yellow colorants or cyan, magenta, yellow and black colorants. A larger number or alternative colorants may also be used.

In printing or displaying an image, the desired density of color over an area is commonly achieved by halftoning where separation density variation is represented by placing greater or less numbers of ON pixels in a discrete area of the separation. In one halftoning method known as dithering or screening, over a given area having a number of gray separation pixels therein, a value representing the density of each separation pixel of an array of gray separation pixels within the area is compared to one of a set of preselected thresholds (the thresholds are stored as a dither matrix and the repetitive pattern generated by this matrix is considered a halftone cell) as taught, for example, in U.S. Pat. No. 4,149,194 to Holladay. The effect of such an arrangement is that for an area where the image is gray, some of the thresholds within the dither matrix will be exceeded i.e. the image value at that specific location is larger than the value stored in the dither matrix for that same location, while others are not. In the binary case, the separation pixels or cell elements for which the thresholds are exceeded might be printed as a maximum colorant value while the remaining separation pixels are allowed to remain white, or not printed, dependent on the actual physical quantity described by the data. The described halftoning method produces an output pattern that is periodic or quasi-periodic in the spatial coordinates.

Error diffusion is another halftoning method and is taught in "An Adaptive Algorithm For Spatial Gray Scale" by Floyd and Steinberg, proceedings of the SID 17/2, 75 to 77 (1976). Another, more elaborate method, is the error diffusion techniques of U.S. Pat. No. 5,045,952 to Eschbach, which provides image dependent edge enhancement, assigned to the same assignee as the present invention. In addition, U.S. Pat. No. 5,353,127 to Shiau describes error diffusion using various schemes for distribution weightings of error and is herein incorporated by reference. Error diffusion attempts to accurately reproduce gray by making a conversion from gray pixels to binary or multilevel pixels on a pixel-by-pixel basis. Error diffusion examines each pixel with respect to a threshold, and the difference between the gray level pixel value and the output value is forwarded to a selected group or set of neighboring pixels in accordance with a weighting scheme. The output binary pattern of the error diffusion algorithm and its derivatives provides a pattern with a local periodicity related to the input level but with no global periodicity. See "Analytic Description of the 1-D Error Diffusion Technique for Halftoning," Optics Communications, Volume 52, No. 3, 165–168 (1984) by R. Eschbach and R. Hauck.

Dithering creates problems in color document reproduction where the repeating pattern of the screen throughout the image when superimposed over similar repeating patterns in multiple separations can cause moire or other artifacts, particularly in printing systems with less than ideal registration between separations.

Error diffusion, on the other hand, operates on a pixel-by-pixel basis and is therefore non-periodic which tends to reduce the problems of moire. Since error diffusion is a deterministic process, however, registration of the different deterministic color separations can lead to a color shift. Such a color shift can be reduced by introducing a random element into the error diffusion process but at the expense of image noise.

Various apparatus and methods for generating images on a recording medium or otherwise with an error diffusion algorithm are described in the following disclosures which may be relevant to certain aspects of the present invention.

U.S. Pat. No. 5,045,952 to Eschbach, describes a method of dynamically adjusting the threshold level of an error diffusion algorithm to selectively control the amount of edge enhancement induced into an encoded output. The threshold level is selectively modified on a pixel-by-pixel basis.

U.S. Pat. No. 5,353,127 to Shiau et al. describes a method for quantizing gray level pixel data with an extended distribution set. Various schemes for distribution weightings of errors is disclosed.

U.S. Pat. No. 5,375,002 to Kim et al. describes an error diffusion circuit and a method for adaptively compensating for the distortion of brightness in color with respect to neighboring pixels. An error diffusion circuit includes a color determining portion for adding CMY signals to a diffusion error to generate a current pixel value, comparing the current pixel value with sequentially supplied error lookup data to determine an address of error lookup data having the smallest error as output pixel color information, and applying the output pixel color information to the printer.

U.S. Pat. No. 5,434,672 to McGuire, describes a pixel error diffusion method. Error distribution in printing and information processing systems is accomplished according to combined internal and external superpixel error diffusion techniques. For a particular superpixel, the error amounts of a selected internal subject pixel are provided to another internal subject pixel until a determined or selected final pixel error value within the selected superpixel has been determined. The final internal error value is distributed among selected superpixels within a predetermined superpixel neighborhood.

U.S. Pat. No. 5,536,019 to Eschbach, describes an error diffusion halftoning with homogeneous response in high/low intensity image regions. The method and apparatus quantizes pixels in an image formed of a plurality of pixels, each pixel constituting an image signal representing optical density of the image at a location therein. During quantization, a threshold signal for quantization determination is dynamically adjusted in accordance with previous output quantization determinations to selectively control the likelihood of whether the next pixel will exceed the threshold.

EP-A-654 940 A1 to Klassen et al. describes a method and apparatus for vector error diffusion with output color control. The method controls the output colors while reducing the visibility of the error diffusion pattern inherent in forming a bilevel image.

"Threshold Modulation In Error Diffusion" by Knox and Eschbach, Journal of Electronic Imaging, July 1993, Volume 2, pages 185–192, describes a theoretical analysis of threshold modulation in error diffusion. Spatial modulation of the threshold is shown to be mathematically identical to processing an equivalent in put image with a standard error diffusion algorithm.

SUMMARY OF THE INVENTION

In accordance with one aspect of the present invention, there is provided a method for processing an input image including a plurality of input pixels each having a first number of possible input levels of optical density to form an output image including a plurality of separations each including a plurality of output pixels each having a second number of possible output levels of optical density. The method includes generating a first threshold reference signal as a function of a plurality of error signals, each of the plurality of error signals being derived by processing previous ones of pixels in each of the plurality of separations, modifying a current one of the plurality of input pixels in a current one of the plurality of separations in accordance with an error signal derived by processing previous ones of pixels in the current one of the plurality of separations, generating a second threshold reference signal for the current one of the plurality of input pixels, and forming one of the output pixels by comparing the modified current one of the plurality of input pixels to the generated first threshold reference signal and the generated second threshold reference signal.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
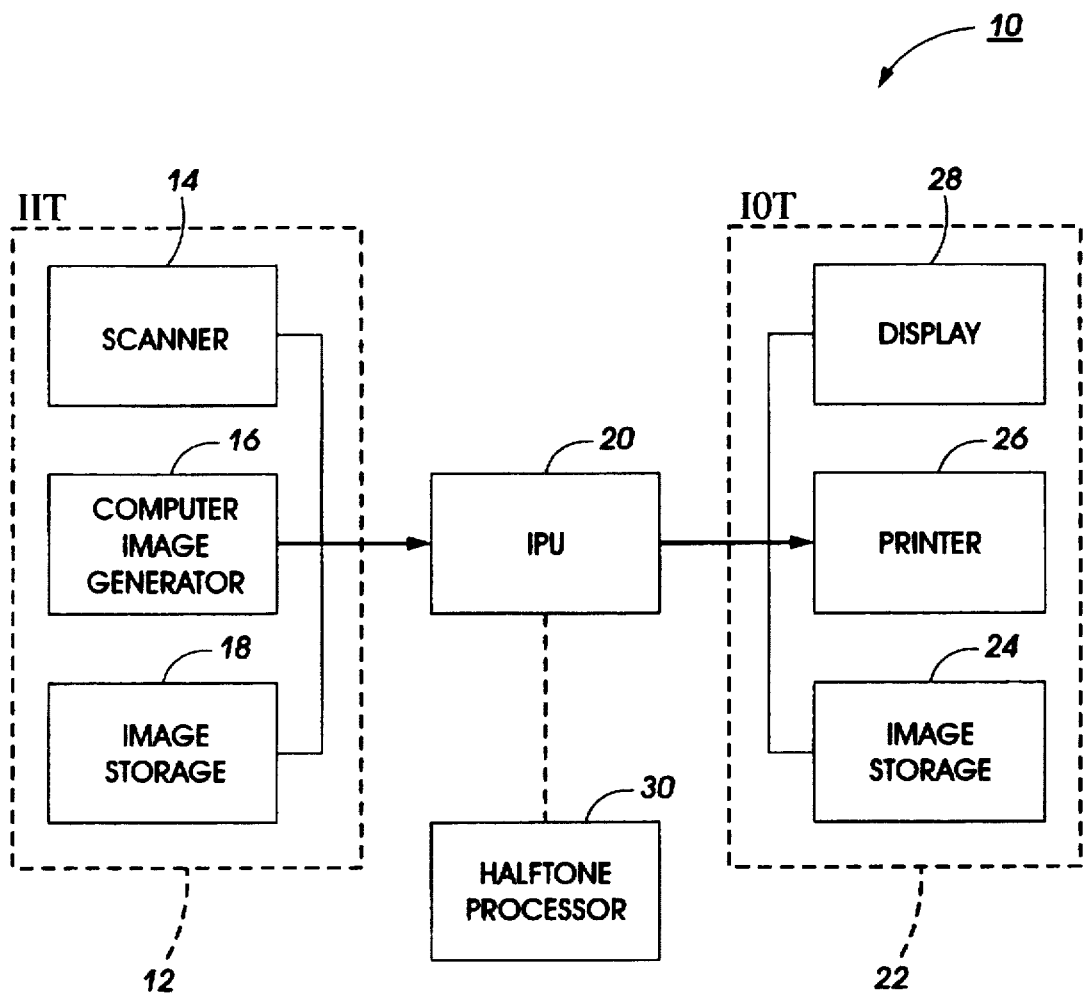
FIG. 1 is a simplified schematic block diagram illustrating an image producing system in which the present invention may be applied.

FIG. 1 illustrates a basic image processing system 10. In the system 10, an electronic representation of a document (hereinafter, an image), from an image input terminal 12 derives electronic digital data in some manner from an original image or other source, in a format related to the physical characteristics of the device typically including pixels divided at m bits per pixel. Typical image input terminals include a scanner 14, a computer image generator 16 and an image storage device 18. Common color scanners, such, for example, Xerox 5775 digital color copiers, or the Pixel Craft 7650 C, produce 8 bits per pixel data at resolutions acceptable for many purposes. The electronic digital data signals, transmitted through an image processing unit 20, are processed for suitable reproduction on an image output terminal 22 which can include an image storage device 24, a printer 26 and a display 28. The printer 26 can include many types of digital image generating printers including xerographic printers, and liquid ink printers, such as continuous stream or drop on demand including piezoelectric, acoustic, phase change wax based, or thermal. Likewise, the display 28, not only includes cathode ray tube types of displays but also LCD displays and other image displays. Image processing unit 20 includes a halftone processor 30 which converts m bit digital image signals to n bit digital image signals, suitable for reproduction by the image output terminal 22, where m and n are integer values.

As used herein, a "pixel" refers to an image signal associated with a particular position in an image having an optical density between a minimum and a maximum. Accordingly, pixels are defined by intensity and position. The pixels may refer to a particular position, region, or superpixel (collection of pixels) in the output image. The image data pixels are commonly grouped into separations. Each separation provides a set of image signals or separation pixels. These might be used to drive a printer to produce one color separation of the image. In the case of multi-color printers, these separations, superimposed together, form the color image. In this context, pixels are described as discrete image signals which represent optical density of the document image in a given small area. In this description, the term gray will be used for pixel values which vary between maximum and minimum, irrespective of the color of the separation in which the signals are used. In addition, the present invention is not limited to a color space using cyan, magenta, yellow, and black but also other color spaces such as color spaces having more than 4 colorants, other common color spaces, such as r, g, b, or color spaces such as those including luminance, chroma, and hue wherein the present invention could be used to enhance the luminance signal or any other space or separation.

Before describing an embodiment of the invention, the principals of the invention will be discussed. In the inventive error sum method and apparatus for intercolor separation control described herein, a color image is processed according to a modified error diffusion algorithm using using error sums. A weighted sum of the errors for the color separations or planes for a given pixel is added to the threshold. The present invention improves on known error diffusion algorithms since it has been found that some kind of interaction between color planes to prevent pixels from randomly clustering is necessary. For instance, when the input values for two colors are close, the separation can show low frequency beating patterns. In particular, when dots print out in adjacent pixel locations the overall dot looks bigger, degrading image quality. It is desirable to either print pixels on top of each other or preferably to separate the pixels on the page for the best possible image quality.

In particular, in order to improve print quality in an ink-jet printer, the overlap of ink drops in the different color planes has to be controlled. Because the colors are printed nearly simultaneously, for ink jet applications it is desirable to process the color planes simultaneously.

One simple way to discourage the clustering of like pixels (color or black) is to raise the threshold when a black or color pixel is set. This in itself, however, is not sufficient to generate a homogeneous pulse distribution. Rather the raising (or lowering) of the threshold has to change the probability of pixels in accordance with the local input value, i.e., a black or color pixel in a region of ¼ intensity should reduce the possibility of another black or color pixel being set for 3 neighboring pixels, and a white pixel in a region of ⅒ intensity should reduce the possibility for 9 neighboring pixels. While this simple approach has value, large areas would have to be stored during processing, with its problems of implementation.

Another approach to controlling pixel distribution among color separations is described in entitled "Multiple Separation Error Diffusion, With Cross Separation Correlation Control For Color Images", to Eschbach, U.S. patent Ser. No. 08/350,365 having a filing date of Dec. 6, 1994, assigned to Xerox Corporation, herein incorporated by reference. This approach uses a threshold imprint which is modified and carried sequentially from one color plane to the next. The threshold imprint is a modification to the threshold at which the decision is made to print a pixel. Although this method attempts to control the correlation of the different color separations, it suffers form the sequential nature in which the color separations are processed. In the referenced invention, the first separation is processed in a manner unaware of the other separations and subsequent separations have to allocate their print pixel positions into locations not occupied by the first separation. This problem worsens for the third and fourth separation where 2 and other output patterns are already fixed, respectively.

Figure 2:
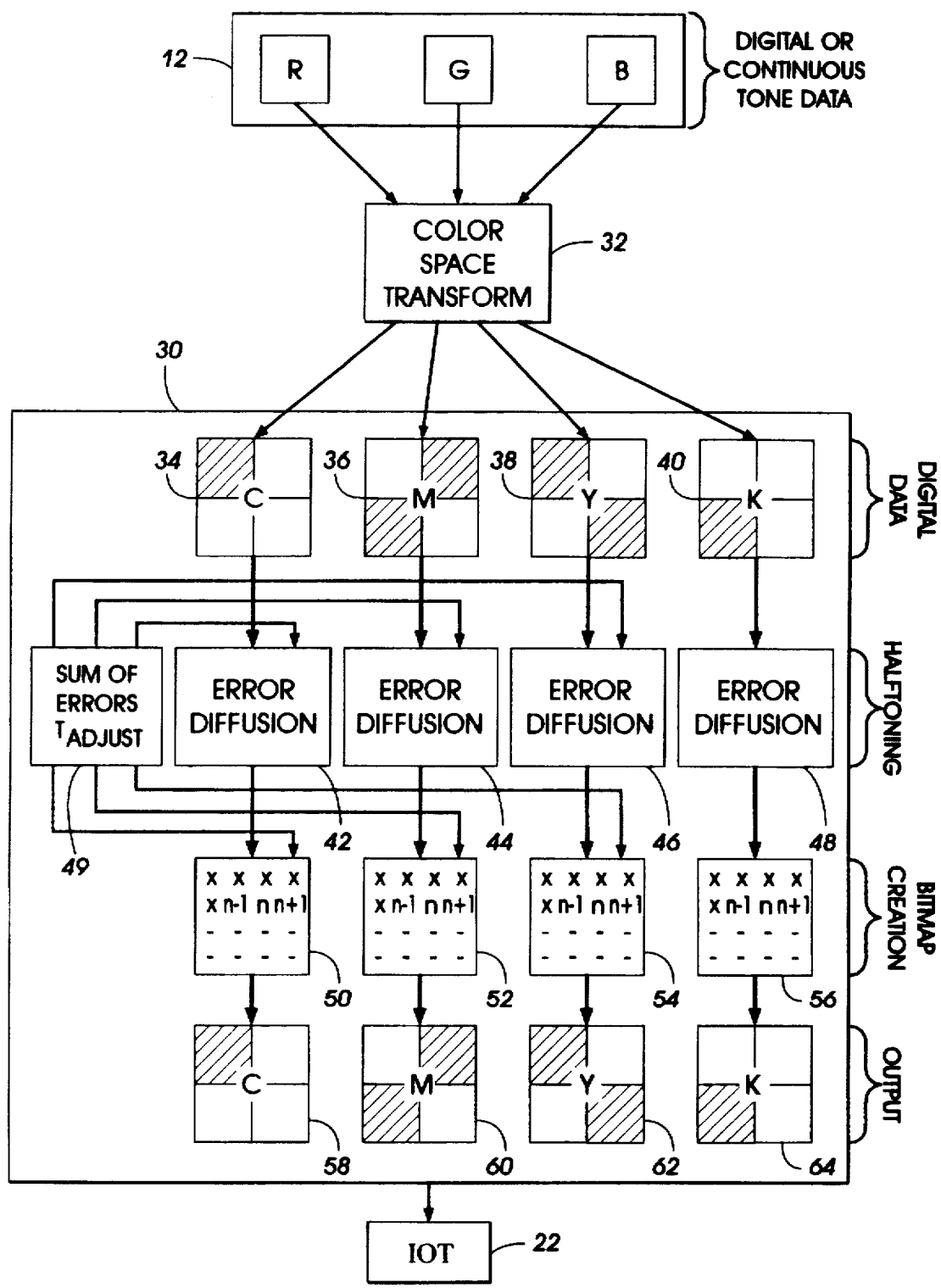
FIG. 2 illustrates a schematic block diagram of the inter-separation color image processing apparatus of the present invention.

FIG. 2 illustrates the present invention as applied to a C, M, Y, and K color space which is particularly applicable in liquid ink printers. The IIT 12 typically generates R, G, and B information either as continuous or digital data. While the R, G, and B information has been separately illustrated, it is common that this information is contained in a page description language (PDL) file which is decomposed by the IPU 20 of FIG. 1. Once decomposed, a color space transformation is made by a color space transform 32 which is typically performed by a software implementation but which can also be embodied in either hardware of hardware/software. The color space transform 32 generates a plurality of bitmaps including a cyan bitmap 34, a magenta bitmap 36, a yellow bitmap 38 and a black bitmap 40, each of which is transmitted to and transformed by the halftone processor 30. The halftone processor 30 applies error diffusion including modification of the threshold by adding the sum of the errors from the separations through the application of error diffusion processors 42, 44, 46, and 48 here illustrated separately, but which can be embodied as well in a single apparatus or software package. Consequently, for the present invention, the standard diffusion algorithm, which is expressed in two equations is modified by the inclusion addition of the sum of the errors to the threshold. The first equation (Equation 1) is modified where the output image pixels b (m,n), are defined as:

$$b\ (m,n) = \text{step}\ [i(m,n) - \Sigma a_{jk} e(m-j,\ n-k) - T_n]\qquad \text{Equation 1}$$

where i equals the image input pixel and T equals the threshold as modified herein.

The second equation (Equation 2) is not modified:

$$e(m,n) = b(m,n) - [i(m,n) - \Sigma a_{jk}\ e(m-j,\ n-k)]\qquad \text{Equation 2}$$

Each of the processors 42, 44, 46 and 48 processes the pixels in a given C, M, Y, and K image separation. Before processing a given pixel in any one of the separations, a weight sum, $T_{adjust}$, of the errors from each of the color planes is computed. This is then used as a threshold function (actually the negative of this quantity). The weight sum, $T_{adjust}$ is calculated and stored in the Sum of Errors Circuit 49 where the errors from the separations are added together by an adder(not shown), multiplied by an adjustment or weight factor by a multiplier (not shown) and subsequently stored. The threshold is computed only once for a given pixel location throughout the color separations, before processing any of the color planes. In one example described herein, the black plane is weighted according to a first weight which is different from the weight selected which is the same for each of the colors separations. It might also be useful to form other weightings of the colors. For example, the average could be weighted more heavily for the darker magenta and cyan than the lighter yellow. The weight sum from each of the color planes is computed using the sums of the errors. This sum is then used for all the color planes. The following equations apply.

$$T_n = T_N + T_{adjust}$$

where $T_{adjust} = -\frac{1}{3}(E_{cyan} + E_{magenta} + E_{yellow})$.

$T_N = 128$(typical) and $T_n$ is the threshold for the current pixel being processed.

This is computed only once per pixel. This method tends to either print the colors on top of each other or to move them apart on the page but to suppress pixels from printing on adjacent pixel locations.

For instance, in FIG. 2, the pixel locations of intermediary bitmaps 50, 52, 54, and 56, which are in the process of being created, illustrates that pixel locations marked with an x have been determined, that locations marked with a "dash" have not been processed, and pixel locations of n−1, n, and n+1 illustrate pixel locations of current interest. A current pixel, n, being processed, for instance in bitmap 54, would have the threshold thereof calculated with the errors from a corresponding pixel n of each of the color planes 50, 52, and 54, that is $T_{adjust}$.

Once the processing for portions of the bitmaps, such as a line, are complete for any one, or more than one of the C, Y, M, and K bitmaps 58, 60, 62, and 64, the portions are transmitted to the IOT 22 for printing or display.

In order to completely separate colors and prevent different colored pixels from printing on top of each other, another adjustment can be made to the error function. The additional adjustment to the threshold is made when a pixel is printed at a given location to suppress colors from printing on the same location. This adjustment has already been demonstrated in R. Eschbach's U.S. patent application Ser. No. 08/350,365 described herein. One difference between the implementation of the Eschbach method and the one described herein is that colors are processed sequentially for each pixel, eliminating the need to store a page of threshold information that will be used when processing the next color plane. There are advantages to processing black first such as KCMY or KYMC though any order for the color planes is possible. For example black can be processed without changing its threshold.

$T_n = T_N$ (typically $T_N = 128$)

Two adjustments are made to the threshold for printing colored pixels, $T_{adjust}$ described earlier and a constant factor that depends on whether the K was black or white. For the first color plane (Y for the examples shown here):

$T_n = T_N + T_{adjust} + C$     K:black $T_n = T_N + T_{adjust} - C/2$    K:white For subsequent color planes, if K was black the constant will stay at C. If K was white constant will stay −C/2 until a color pixel is printed. Then the threshold becomes $T_n = T_N + T_{adjust} + C/2$    K:white, and CM or Y prints for processing the subsequent colors. Thereafter, the constant remains at C/2.

In setting C to a value of 64 for this additional term, it has been found that the different colors are separated and don't overlap in highlight regions of an output image. When printing black as well, it has been found advantageous to use a larger adjustment to the threshold when a black pixel was printed with the constant C rather than +/−C/2 so that in the midtones and shadows the colors would overlap with each other rather than the black pixel locations.

In a vector error diffusion algorithm described in "Method and Apparatus for Vector Error Diffusion with Output Color Control", EP-A-654 940 to Klassen et al., an error sum adjustment is calculated but rather than being used as an adjustment to the threshold, it is used as a separate condition for printing (i.e. no dot is printed unless the sum of the errors exceeds some separate threshold value). The major difference between the optimization of the two algorithms is the importance of this term. Obviously, if the error sum is small (such as zero) there is very little effect on the error diffusion output for either method. The vector error diffusion approach, however, uses the error sum criterion to determine whether a pixel is printed at all. Then, the vector part of the algorithm subsequently determines the optimum color or colors to print on a given pixel location.

In contrast, the error sum of the present invention is a weak determinator of the output pixel. It can be augmented by a secondary adjustment described earlier by Eschbach. Essentially, the present invention balances the normal error diffusion threshold criteria and the additional adjustments to optimize pixel placement in one step. Thus, the normal error diffusion mechanism of threshold comparison has been modified to improve the distribution of the pixels in the highlight regions. It has been shown, therefore, that the present invention that is essentially scalar in nature can accomplish pixel separation without vector calculations which are the most time consuming part of vector approaches. A criteria that prevents the algorithm here from printing when the input value is zero can be useful to prevent spurious pixels from printing (or not printing) at the edges of where dark multi-color regions and light regions meet. The same beneficial effect can be achieved without such a criterion by using a small amount of edge enhancement.

Figure 3:
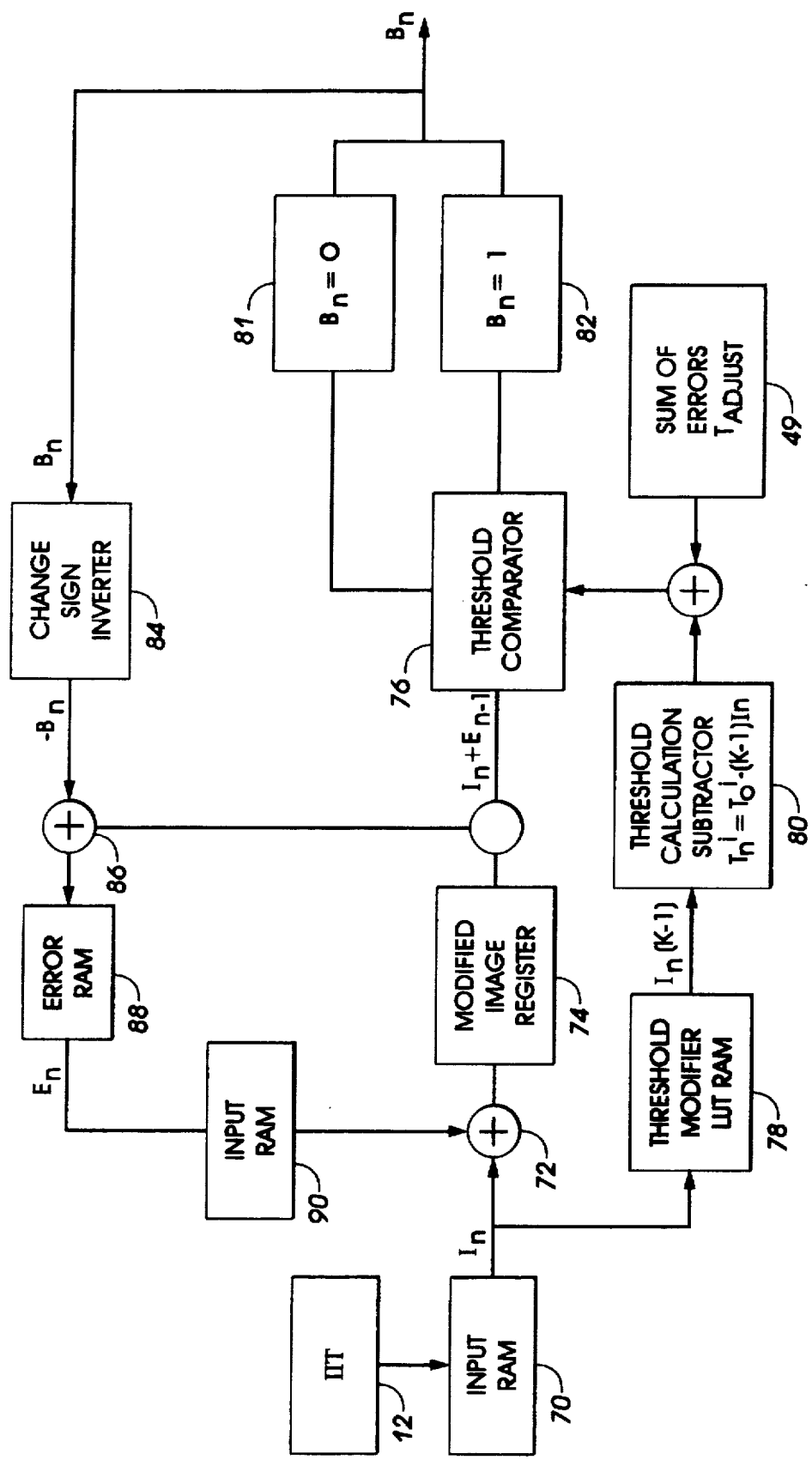
FIG. 3 illustrates an error diffusion circuit useful in the present invention.

FIG. 3 illustrates an error diffusion circuit of the present invention for processing a single one of the separations. Three other similar circuits, each one corresponding to one of the remaining separations are included but not shown. A single circuit encompassing the entirety is also within the scope of the present invention. The circuit of FIG. 3 is incorporated into the halftone processor 30 of FIG. 1. FIG. 3 shows a binary version of the algorithm. Multi-level output is also compatible with this method. The halftone processor of FIG. 1 can either be a dedicated hardware circuit using standard logic circuits or a single chip using VLSI designs. More likely, however, the circuit of FIG. 3 may be implemented in a microprocessor including the appropriate software control programmed according to well known practices. It is commonplace to program and execute error control diffusion algorithms with software instructions for conventional or general purpose microprocessors. This is taught by various prior patents and commercial products. Such programming or software may, of course, vary depending on the particular functions, software type, and microprocessor or other computer system utilized but will be available to, or readily programmable, without undue experimentation from functional descriptions such as those provided herein or with prior knowledge of functions which are conventional together with general knowledge in the software and computer arts. Such software can include object oriented software development environments, such as C++.

The image input terminal 12 transmits a signal to an input random access memory (RAM) 70 which stores portions of or one or more complete full page image bitmaps. The input RAM is addressed to introduce the input digital image signal $I_n$ into the circuit on a pixel-by-pixel basis where n indicates the pixel currently being processed. Each input pixel has its corresponding error $E_{n-1}$ added to the input value at an adder 72. The modified image is temporarily stored in a modified image register 74. The modified image $I_n + E_{n-1}$ is transferred to a threshold comparator 76. A modified threshold level, $T_n$ is determined by first calculating a modifier based on the input value $I_n$ of each pixel as represented by a threshold modifier lookup table 78 stored in RAM or some other data storage device. Values of input levels $I_n$ as well as corresponding threshold modifiers (K−1) are stored in the lookup table 78 and are selected in response to the value of the input $I_n$. The modified $I_n$ (K−1) is then subtracted from the nominal threshold value $T_0$ in a threshold calculation subtractor 80 to determine the threshold value $T_n$ to be applied at the threshold comparator 76.

In addition to the threshold modifier 78, the sum of errors RAM 49, storing the sum of errors from each of the separations, i.e. $T_{adjust}$ is accessed and used to modify $T_n$.

The modified image value $I_n + E_{n-1}$ is compared to the modified threshold level $T_n$ to determine the appropriate output level $B_n$. This comparison determines the output level $B_n$, which is to be transmitted to the image output terminal 22 of FIG. 1. A $B_n$=zero 81 or a $B_n$=one 82. While only two outputs are shown, it is possible than many outputs are possible especially in printers capable of multiple output levels such as acoustic ink printers.

When the modified image, $I_n+E_{n-1}$ exceeds the threshold level $T_n$, the corresponding output level of one is selected. If however, $I_n+E_{n-1}$ is less than the threshold level $T_n$, the corresponding output level of zero is selected. These values are not only sent to the IOT 22 but also transmitted to the change sign inverter 84. The transmitted level is subtracted from the modified image value to determine the error level for the subsequent input pixel. The subtraction operation occurs due to the sign inversion performed by the change sign inverter and the adder 86, the value of which is stored in the error RAM 88. A delay buffer 90 generates a single pixel delay to store the error value in a 1 dimensional situation.

While the embodiments disclosed herein are preferred, it will be appreciated from this teaching that various alternatives, modifications, variations or improvements therein may be made by those skilled in the art, which are intended to be encompassed by the following claims. For instance, the present invention is not limited to only copying machines and printing machines of all types but also includes display devices such as cathode ray tube, light emitting diode displays, liquid crystal displays, and any display displaying images using multi-level output pixels. In addition, the present invention, is not limited to error diffusion, but to other image processing methods and apparatus which use feedback and thresholding to alter an image. Accordingly, the present invention is intended to embrace all such alternatives, modifications, and variations that fall within the spirit and broad scope of the appended claims.

What is claimed is:

1. A method for processing an input image including a plurality of input pixels each having a first number of possible input levels of optical density to form an output image including a plurality of separations each including a plurality of output pixels each having a second number of possible output levels of optical density, comprising:

generating a first threshold reference signal as a function of a plurality of error signals, each of the plurality of error signals being derived by processing previous ones of pixels in each of the plurality of separations;

modifying a current one of the plurality of input pixels in a current one of the plurality of separations in accordance with an error signal derived by processing previous ones of pixels in the current one of the plurality of separations;

generating a second threshold reference signal for the current one of the plurality of input pixels; and forming one of the output pixels by comparing the modified current one of the plurality of input pixels to the generated first threshold reference signal and the generated second threshold reference signal.

2. The method of claim 1, wherein said first generating step comprises generating the first threshold reference signal as a function of a threshold adjustment signal.

3. The method of claim 2, wherein said first generating step comprises generating the threshold adjustment signal as a function of a plurality of error signals, each of the plurality of error signals corresponding to one of the plurality of corresponding pixels from each of the plurality of separations.

4. The method of claim 3, wherein said first generating step comprises generating the threshold adjustment signal by summing the plurality of error signals and multiplying the sum by an adjustment factor.

5. The method of claim 4, wherein said first generating step comprises setting the adjustment factor to an average of the plurality of error signals.

6. The method of claim 5, wherein said first generating step comprises setting the adjustment factor to a value of a negative one-third.

7. The method of claim 4, wherein said forming step comprises forming one of the output pixels by comparing the modified current one of the plurality of input pixels to the generated threshold adjustment signal and the generated second threshold reference signal.

8. The method of claim 7, wherein said forming step comprises forming one of the output pixels by summing the generated threshold adjustment signal to the generated second threshold reference signal.

9. The method of claim 8, wherein said generating step comprises generating the first threshold reference signal as a function of the error signals derived for each of the plurality of corresponding pixels selected from a cyan, magenta, and yellow separation.

10. The method of claim 9, wherein the first number of possible input levels is greater than the second number of possible output levels.

11. The method of claim 8, wherein said generating step comprises generating the first threshold reference signal as a function of the error signals derived for each of the plurality of corresponding pixels selected from a red, green, and blue separation.

12. The method of claim 8, wherein said generating step comprises generating the first threshold reference signal as a function of the error signals derived for each of the plurality of corresponding pixels selected from four or more separations.

13. The method of claim 3, wherein said first generating step comprises generating the threshold adjustment signal by multiplying each of the plurality of error signals by an adjustment factor.

14. The method of claim 13, wherein said first generating step comprises generating the threshold adjustment signal by multiplying each of the plurality of error signals by a different adjustment factor.

15. The method of claim 14, wherein said forming step comprises forming one of the output pixels by comparing the modified current one of the plurality of input pixels to the generated threshold adjustment signal and the generated second threshold reference signal.

16. The method of claim 15, wherein said forming step comprises forming one of the output pixels by summing the generated threshold adjustment signal to the generated second threshold reference signal.

17. The method of claim 16, wherein said generating step comprises generating the first threshold reference signal as a function of the error signals derived for each of the plurality of corresponding pixels selected from a cyan, magenta, and yellow separation.

18. The method of claim 17, wherein the first number of possible input levels is greater than the second number of possible output levels.

19. The method of claim 16, wherein said generating step comprises generating the first threshold reference signal as a function of the error signals derived for each of the plurality of corresponding pixels selected from a red, green, and blue separation.

20. The method of claim 16, wherein said generating step comprises generating the first threshold reference signal as a function of the error signals derived for each of the plurality of corresponding pixels selected from four or more separations.

* * * * *